(12) United States Patent
Kojima et al.

(10) Patent No.: US 9,369,204 B2
(45) Date of Patent: Jun. 14, 2016

(54) SYSTEM AND METHOD FOR MEASURING LINEWIDTH OF OPTICAL SIGNAL

(71) Applicants: Mitsubishi Electric Research Laboratories, Inc., Cambridge, MA (US); Mitsubishi Electric Corporation, Chiyoda-ku, Tokyo (JP)

(72) Inventors: Keisuke Kojima, Weston, MA (US); Toshiaki Koike-Akino, Malden, MA (US); Yuichiro Horiguchi, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/633,810

(22) Filed: Feb. 27, 2015

(65) Prior Publication Data

US 2016/0105235 A1     Apr. 14, 2016

Related U.S. Application Data

(60) Provisional application No. 62/063,120, filed on Oct. 13, 2014.

(51) Int. Cl.
   *H04B 10/64*     (2013.01)
   *H04B 10/079*    (2013.01)

(52) U.S. Cl.
   CPC .......... *H04B 10/07957* (2013.01); *H04B 10/64* (2013.01)

(58) Field of Classification Search
   CPC .......................... H04B 10/64; H04B 10/07957
   USPC ....................................................... 398/25, 28
   See application file for complete search history.

(56) References Cited

U.S. PATENT DOCUMENTS

| | | | | | |
|---|---|---|---|---|---|
| 6,304,369 | B1* | 10/2001 | Piehler | ............... | H04B 10/2507 359/337.4 |
| 7,200,339 | B1* | 4/2007 | Roberts | ................ | H04B 10/505 398/158 |
| 2006/0159135 | A1* | 7/2006 | Cliche | ..................... | H01S 5/042 372/20 |
| 2014/0140652 | A1* | 5/2014 | Aflatouni | ................ | G02F 1/011 385/3 |
| 2015/0198503 | A1* | 7/2015 | Leblanc | ............ | G01M 11/3145 356/73.1 |

OTHER PUBLICATIONS

T. Okoshi et al., "Novel method for high resolution measurement of laser output spectrum," Electronics Letters, vol. 16, p. 630 (1980).
Y. Yamamoto et al, "Quantum phase noise and linewidth of a semiconductor laser," Electronics Letters, vol. 17, p. 327 (1981).

(Continued)

*Primary Examiner* — Dalzid Singh
(74) *Attorney, Agent, or Firm* — Gene Vinokur; James McAleenan; Hironori Tsukamoto (57) ABSTRACT

A system for measuring a linewidth of an optical signal includes an optical sensor determining a set of measurements of the linewidth of the optical signal propagated over different distances. Each measurement corresponds to a different distance, and includes a white frequency modulation (FM) noise and a low frequency FM noise. The system also includes a processor for determining values of the white FM noise and the LF FM noise reducing a difference between the measurements and values of the linewidth of the optical signal calculated for the different distances with the values of the white FM noise and the LF FM noise.

20 Claims, 10 Drawing Sheets (56) References Cited

OTHER PUBLICATIONS

K. Kikuchi, "Characterization of semiconductor-laser phase noise and estimation of bit-error rate performance with low-speed offline digital coherent receivers", Optics Express, vol. 20, p. 5291 (2012).

K. Matsuda et al, "A Study of Laser While and Brownian FM noise in Coherent QPSK Signals," Conference on Optical Fiber Communications (OFC), paper W4K.4 (2014).

* cited by examiner

SYSTEM AND METHOD FOR MEASURING LINEWIDTH OF OPTICAL SIGNAL

RELATED APPLICATIONS

This Patent Application claims priority to Provisional Patent Application 62/063,120, "System and Method for Measuring Linewidth of Optical Signal" filed by Keisuke Kojima on Oct. 13, 2014, incorporated herein by reference.

FIELD OF THE INVENTION

This invention relates to optical communication using coherent optical signals, and more specifically a system and a method for measuring a linewidth of an optical signal.

BACKGROUND OF THE INVENTION

Optical transmission systems are used in various communication applications. For example, telecommunication systems can utilize optical fiber technology to transmit voice and data signals over long distances. Similarly, cable television networks transmit both analog and digital signals with optical fiber technology. In order to transmit a signal (e.g., a data signal) over an optical fiber, a light beam ("carrier") is modulated with the information signal. The modulated carrier is then transmitted to a receiver via the optical fiber.

Coherent optical communication systems utilize the phase of the optical carrier to significantly increase the capacity and distance of optical communication. In order to extract the phase information in the receiver end, the light source has to have a very narrow spectral linewidth, i.e., high frequency purity. Considerable efforts have been made to provide laser light sources that operate with a narrow spectral linewidth. To that end, a number of methods have been developed to measure the linewidth of the laser beam to determine suitability of the laser in the coherent optical communication.

Coherent optical transmission is sensitive to the linewidth of the laser beam, which is subject to noise including a white frequency modulation (FM) noise and a low frequency (LF) FM noise. The white FM noise is constant level over the entire frequency range. The LF FM noise has a higher noise level when the frequency becomes lower, which is also called the 1/f noise. However, only the white FM noise affects the quality of the coherent optical transmission, while the LF FM noise can be cancelled by the receiver of the optical signal, or does not affect the receiver performance. Accordingly, there is a need to measure the linewidth of the optical signal, and components of the noise of the measurement to understand the suitability of the laser for coherent optical communication.

For example, the method described in T. Okoshi et al., "Novel method for high resolution measurement of laser output spectrum," Electronics Letters, vol. 16, p. 630 (1980), measured the linewidth using a simple delayed self-heterodyne method, but does not separate the white FM noise and the LF FM noise.

Another method described in Y. Yamamoto et al, "Quantum phase noise and linewidth of a semiconductor laser," Electronics Letters, vol. 17, p. 327 (1981), uses an optical frequency discriminator to convert the FM noise into AM noise, thus enabling the direct measurement of the FM noise spectrum. However, the frequency discriminator requires careful calibration and feedback for laser wavelength stabilization, which is complicated and difficult.

The method described in K. Kikuchi, "Characterization of semiconductor-laser phase noise and estimation of bit-error rate performance with low-speed offline digital coherent receivers", Optics Express, vol. 20, p. 5291 (2012) and K. Matsuda et al, "A Study of Laser While and Brownian FM noise in Coherent QPSK Signals," Conference on Optical Fiber Communications (OFC), paper W4K.4 (2014) separates the LF noise using coherent detection with a reference to very narrow linewidth laser with a very similar wavelength to the laser under test. Therefore, for different lasers different reference has to be used, which is undesirable.

Accordingly, there is a need for a system and method that can separate or measure the white and LF components of the FM noise in a configuration that does not require a reference laser or laser wavelength stabilizer and frequency discriminator.

SUMMARY OF THE INVENTION

Some embodiments of the invention are based on recognition that a single measurement of the linewidth of the optical signal cannot distinguish the right combination of values a white frequency modulation (FM) noise and a low frequency (LF) FM noise from all possible combinations. This is because a single measurement of the linewidth of the optical signal can include multiple combinations of values of white and LF FM noises. This problem is analogous to a problem of solving one equation with two unknowns. In order to determine the two unknowns, two equations are needed.

Some embodiments of the invention are based on recognition that the contribution of the LF FM noise into a total noise is increased with distance traveled by the optical signal with constant parameter describing LF FM noise. Accordingly, the ambiguity of multiple possible combinations of the values of white and LF FM noises can be resolved by conducting multiple measurements using different lengths of the optical fiber. This is because only a single combination of the white FM noise and LF FM noise can result in all such measurements.

Accordingly, one embodiment of the invention discloses a system for measuring a linewidth of an optical signal. The system includes an optical sensor determining a set of measurements of the linewidth of the optical signal propagated over different distances, such that each measurement corresponds to a different distance and includes a white frequency modulation (FM) noise and a low frequency FM noise; and a processor for determining values of the white FM noise and the LF FM noise reducing a difference between the measurements and values of the linewidth of the optical signal calculated for the different distances with the values of the white FM noise and the LF FM noise.

Another embodiment discloses a method for determining a linewidth of an optical signal, including propagating the optical signal over different distances selected from a set of predetermined distances; measuring the linewidth of the optical signal propagated over the different distances to produce a set of measurements, each measurement corresponds to a predetermined distance from the set of predetermined distances and includes a white frequency modulation (FM) noise and a low frequency FM noise; and determining values of the white FM noise and the LF FM noise reducing a difference between the measurements and values of the linewidth of the optical signal calculated for the set of predetermined distances with the values of the white FM noise and the LF FM noise.

Yet another embodiment discloses a system for measuring a linewidth of an optical signal. The system uses a waveguide for propagating the optical signal over different distances selected from a set of predetermined distances; an optical sensor determining a set of measurements of the linewidth of the optical signal propagated over the different distances, such that each measurement corresponds to a different distance and includes a white frequency modulation (FM) noise and a low frequency FM noise; and a processor for determining a combination of values of the white FM noise and the LF FM noise forming to values of the linewidth of the optical signal over the different distances according to the set of measurements.

DETAILED DESCRIPTION OF THE PREFERRED EMBODIMENT

Figure 1:
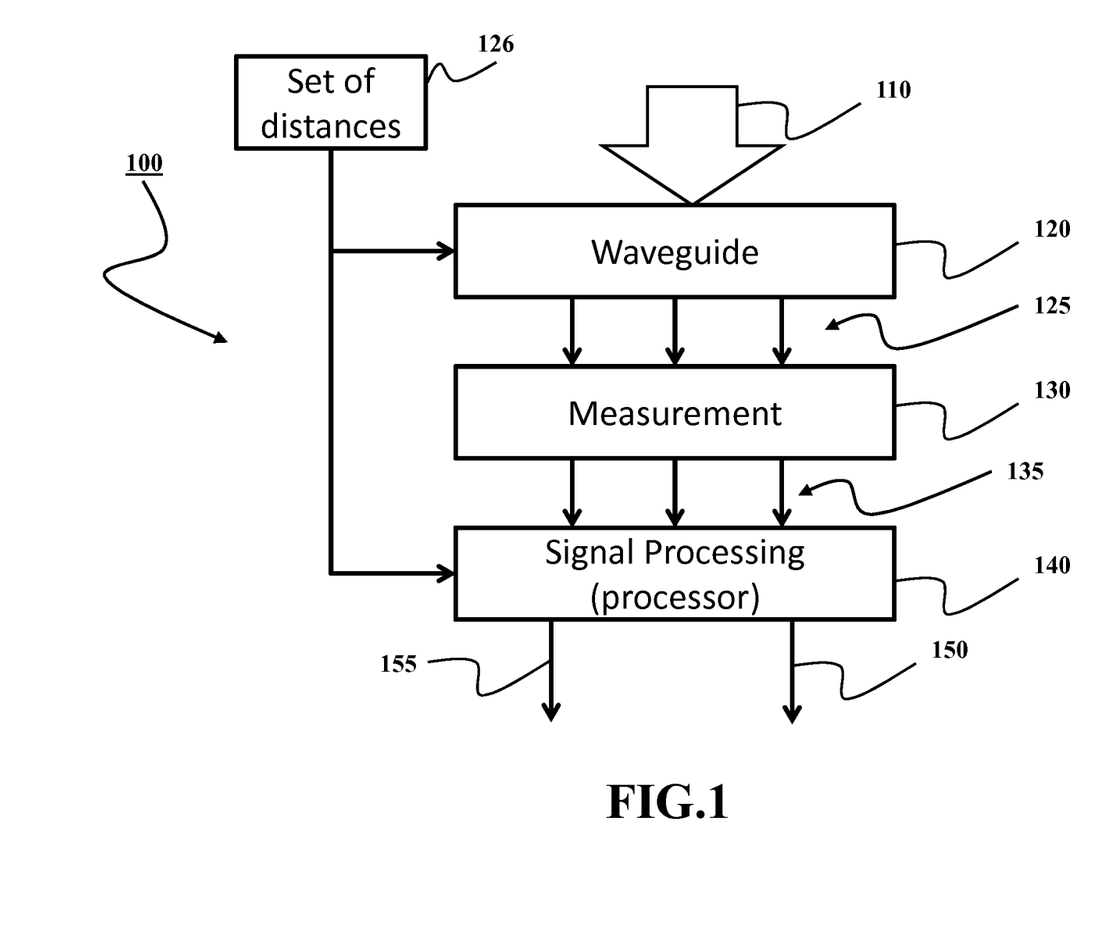
FIG. 1 is a block diagram of a system for measuring a linewidth of an optical signal and at least one component of the noise of the linewidth according to some embodiments of the invention.

FIG. 1 shows a block diagram of a system 100 for measuring a linewidth 150 of an optical signal 110 and at least one component of the noise 155 of the linewidth 150. The optical signal 110 can be any type of coherent light source. For example, the optical signal 110 can be generated by a semiconductor laser, a solid-state laser, or a gas laser.

The system 100 includes a waveguide 120 for propagating the optical signal 110 over different distances. In one embodiment, the waveguide is formed using an optical fiber, e.g., single mode optical fiber. Alternative embodiments propagate the optical signal through the air or a photonic integrated circuit. The waveguide 120 outputs a set of optical signals 125. Each optical signal in the set 125 is formed by the optical signal 110 propagated over a different distance 126.

The system also includes a measurement module 130 for receiving optical signals 125 and for determining a set of measurements 135 of the linewidth of each of the optical signals 125. The measurement can be done sequentially, or concurrently, e.g., in parallel. In some embodiments of the invention, the measurement module uses a delayed self-heterodyne method for measuring the linewidth of the optical signal 110.

The distances for propagating the optical signal 110 can be predetermined, e.g., selected from a set of predetermined distances 126 different from each other, such that the measurement module 130 receives a set of optical signals 125 propagated over the predetermine distances 126 and determines the set of measurements 135, such that a measurement in the set 135 corresponds to a predetermined distance from the set 126.

The measurements 135 include noise having at least two components, i.e., a white frequency modulation (FM) noise and a low frequency (LF) FM noise. The system 100 also includes a signal processing unit 140, e.g., implemented using a processor, for determining separate values of the white FM noise and/or the LF FM noise components in the linewidth measurements.

Some embodiments of the invention are based on recognition that only the white FM noise affects the quality of the optical transmission, while the LF FM noise can be cancelled by the receiver of the optical signal and/or does not affect the receiver performance. Accordingly, the embodiments measure not only the linewidth of the optical signal, but also components of the noise of the measurement to understand the suitability of the laser of the coherent optical communication.

Some embodiments of the invention are based on recognition that a single measurement of the linewidth of the optical signal cannot distinguish the correct combination of values the white FM noise and the LF FM noise from all the possible combinations. This is because a single measurement of the linewidth of the optical signal can include multiple combinations of values of white and LF FM noise components. This problem is analogous to a problem of solving one equation with two unknowns, i.e., two equations are needed to determine the two unknowns.

Some embodiments of the invention are based on recognition that the contribution of the LF FM noise into a total noise and the measurement of the linewidth is increased with distance traveled by the optical signal. However, despite the fact that the contribution of the LF FM noise varies with distance, a parameter describing LF FM noise remains constant. This contradiction is due to the 1/f nature of the LF FM noise.

Accordingly, the ambiguity of multiple possible combinations of the values of white and LF FM noises can be resolved by conducting multiple measurements using different lengths of the optical fiber. Only a single combination of the white FM noise and LF FM noise can fit in all such measurements.

Accordingly, in some embodiments of the invention, the signal processing unit 140 receives different measurements of a linewidth of the optical signal submitted over different distances, and determines values 155 of the white FM noise and/or the LF FM noise reducing a difference between the measurements and values of the linewidth calculated with the values 155 of the white FM noise and the LF FM noise.

Figure 2:
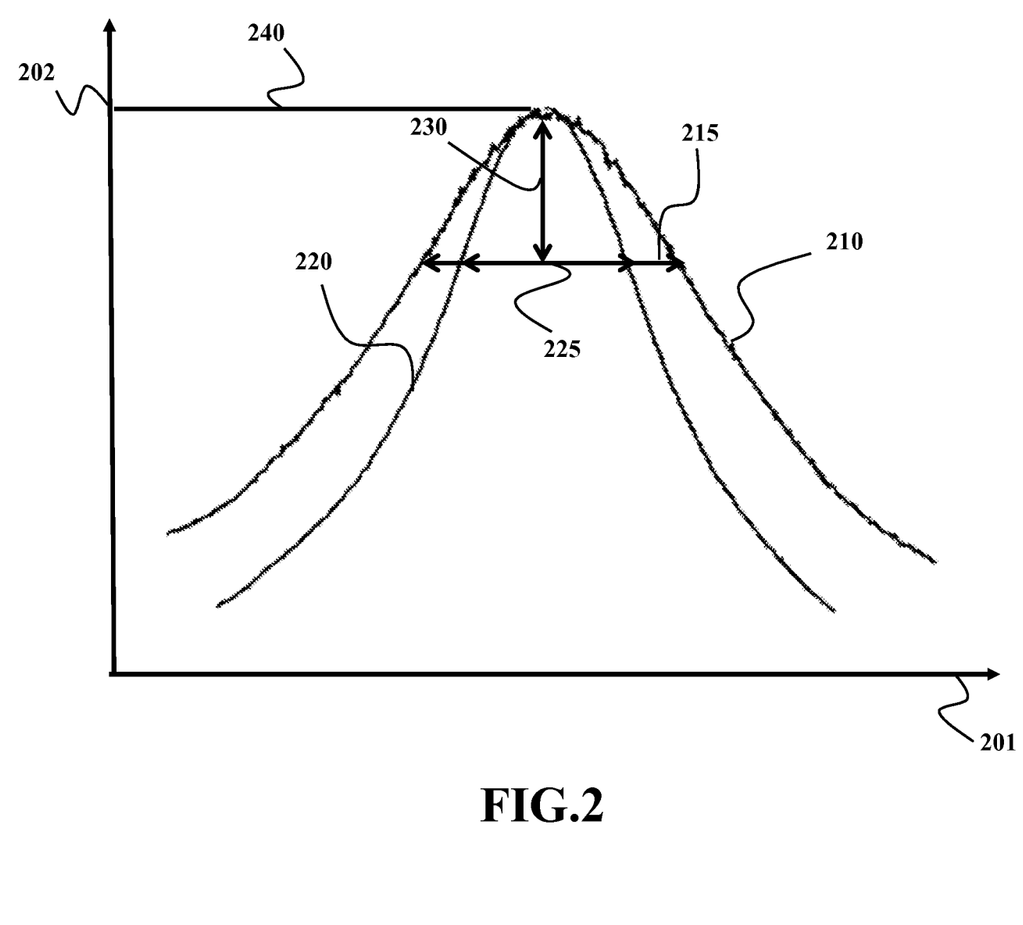
FIG. 2 is a graph of spectra I(f) of an optical signal propagated over different distances according to some embodiments of the invention.

FIG. 2 shows the measured spectra I(f) of an optical signal propagated over different distances. The horizontal axis 201 shows the frequency of the optical signal, and the vertical axis 202 shows the intensity in dB. Due to the effect of the LF FM noise, the spectrum 210 of a first signal formed by the optical signal 110 propagated over a first distance is different that the spectrum 220 of a second signal formed by the optical signal 110 propagated over a second distance. In this example, the first distance is greater than the second distance, and both distances are relatively long, e.g., greater than 1 km.

The different linewidth 215 and 225 of the first and the second signals can be measured at a predetermined level 230, e.g., 3 dB, from the peak of the spectra. For example, one embodiment measures the linewidth at half width of half maximum of the signal peak 240.

Figure 3:
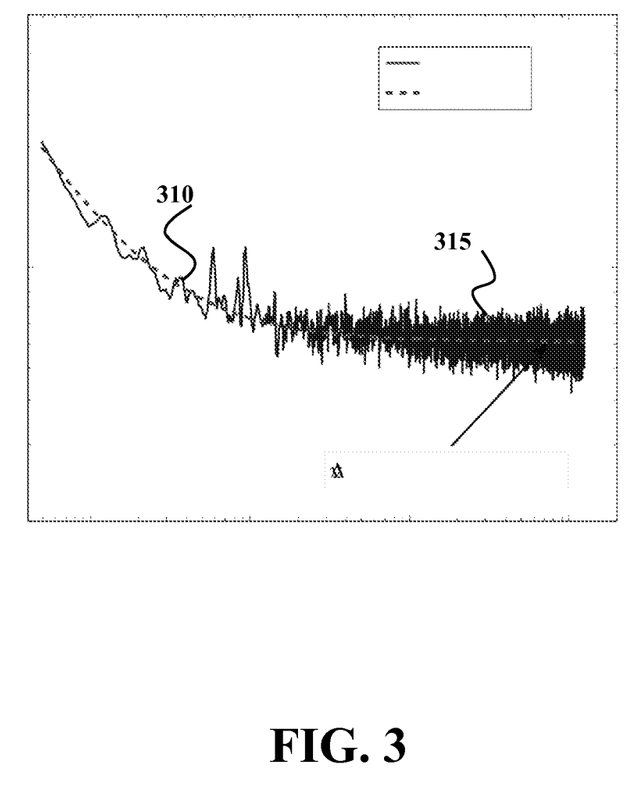
FIG. 3 is a graph illustrating an increase of contributions of a low frequency (LF) FM noise into the total noise of the measurements.

FIG. 3 shows a graph illustrating the FM noise spectrum, where the LF FM noise contribution 310 and the white noise contribution 315 can be observed. Some embodiments of the invention are based on realization that a measurement of a linewidth of the optical signal includes a combination of the white FM noise $N_W$ that is constant for the entire spectrum, and the LF FM noise $N_{LF}$, which is a function of a constant parameter K describing LF FM noise and the frequency f.

Accordingly, a relationship of the measurement M of the linewidth of the optical signal 110 with components of such a measurement can be represented as $$M = f(N_W + K/f, \tau_d), \quad (1)$$

wherein $N_W$ and K are unknowns, f is the frequency, $\tau_d = L_f/c$ is the delay time caused by the optical fiber of length $L_f$, and c is the speed of light.

Determining the measurement of the linewidth of the optical signal propagated over different predetermined distances the ambiguity of Equation (1) can be resolved according to $$M_i = f(N_w + K/f, \tau_{d_i}), \quad (2)$$

wherein i is an index of the measurement.

For example, the three measurement of the linewidth of the signal propagated over three different distances can form a linewidth system of equations $$M_1 = f(N_w + K/f, \tau_{d_1}),$$

$$M_2 = f(N_w + K/f, \tau_{d_2}),$$

$$M_3 = f(N_w + K/f, \tau_{d_3}). \quad (3)$$

Because the distances $d_i$ and hence delay times $\tau_{d_i}$ are predetermined 126, and the measurement $M_i$ are determined 130, the solution for such a system of equations produces the values for the white FM noise $N_W$, and the LF FM noise $N_{LF}$. Since measurements include errors, it is generally better to have more measurement points.

Solving Linewidth System of Equations Analytically

Figure 4A:
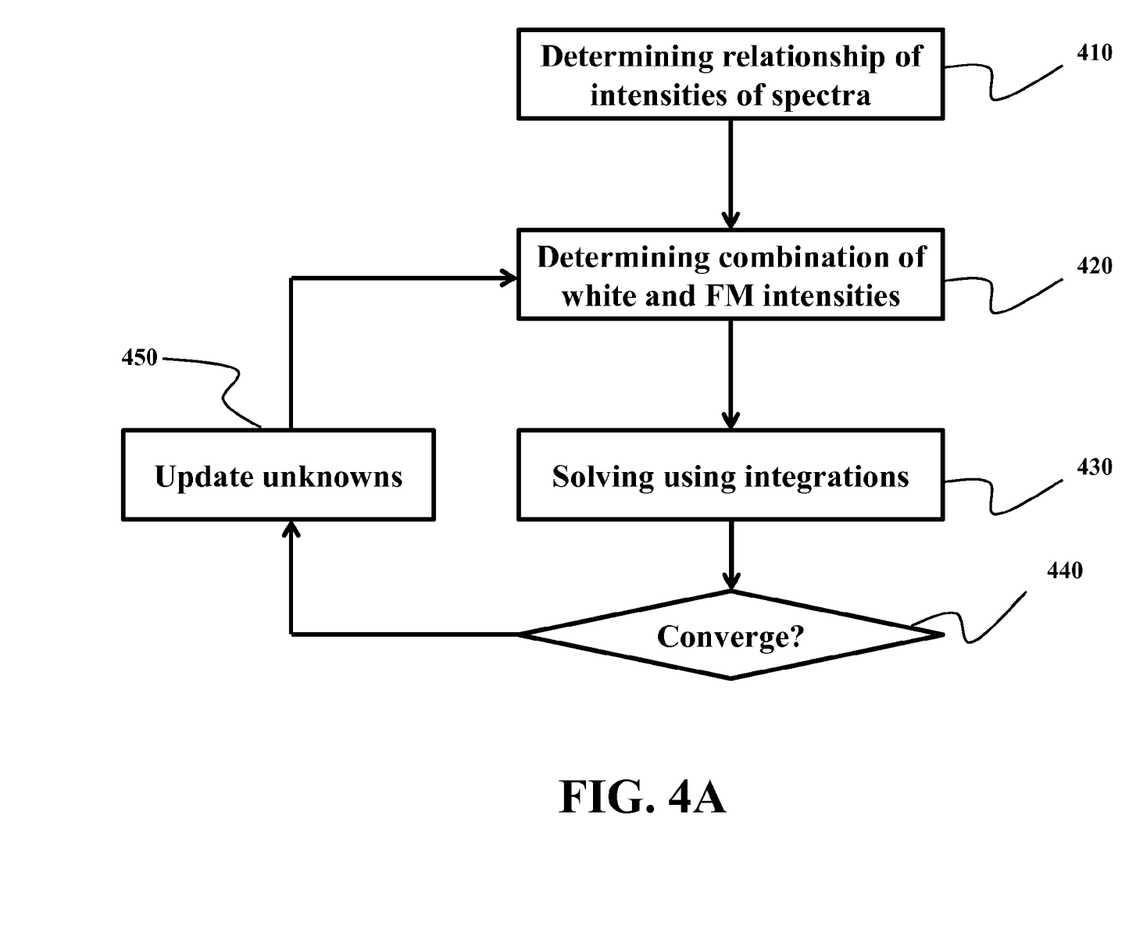
FIGS. 4A and 4B show block diagrams of different embodiments of a method for determining linewidth and components of the noise of the linewidth analytically according to some embodiments of the invention.

FIG. 4A shows a block diagram of a method for solving the system of Equation (2) numerically according to some embodiments of the invention. For example, several embodiments represent 410 the relationship of the measurement M of the linewidth as a function of the intensity of the spectra of the optical signal and the FM noise, wherein the intensity of the FM noise is a combination 420 of intensities of the white FM noise and the LF FM noise. Some embodiments express the measured spectrum I(f) as $$I(f) = \mathcal{F}\left[\exp\left\{-4\int_0^\infty S(f')\frac{\sin^2 \pi f't}{f'^2}(1-\cos 2\pi f'\tau_d)df'\right\}\right], \quad (4)$$

where f is the measured frequency, F is the Fourier transform, and the FM noise spectrum S(f) is expressed as $$S(f) = \Delta v/\pi + K/f, \quad (5)$$

where $\Delta v$ is the intrinsic laser linewidth and the first term represents the white FM noise, whose intensity is constant across the whole frequency range, while the second term K/f is a 1/f noise, whose intensity increases as the frequency becomes lower.

Some embodiments determine an "apparent" linewidth as a half width half maximum (HWHM) of the spectrum. In case there is no LF FM noise, the apparent linewidth agrees with the intrinsic linewidth, i.e., $\Delta v$, which determines the coherent communication system's performance.

Some embodiments of the invention solves 430 the equation of relationships of the spectra using multiple instances of integration over a pole and a fast oscillating factor. A set of the calculated results is compared 440 to the set of measurement data in order to evaluate the error, and if the error is larger than a predetermined value, the computation is not considered converged, and the unknown parameters are updated 450 and repeat the process.

Figure 4B:
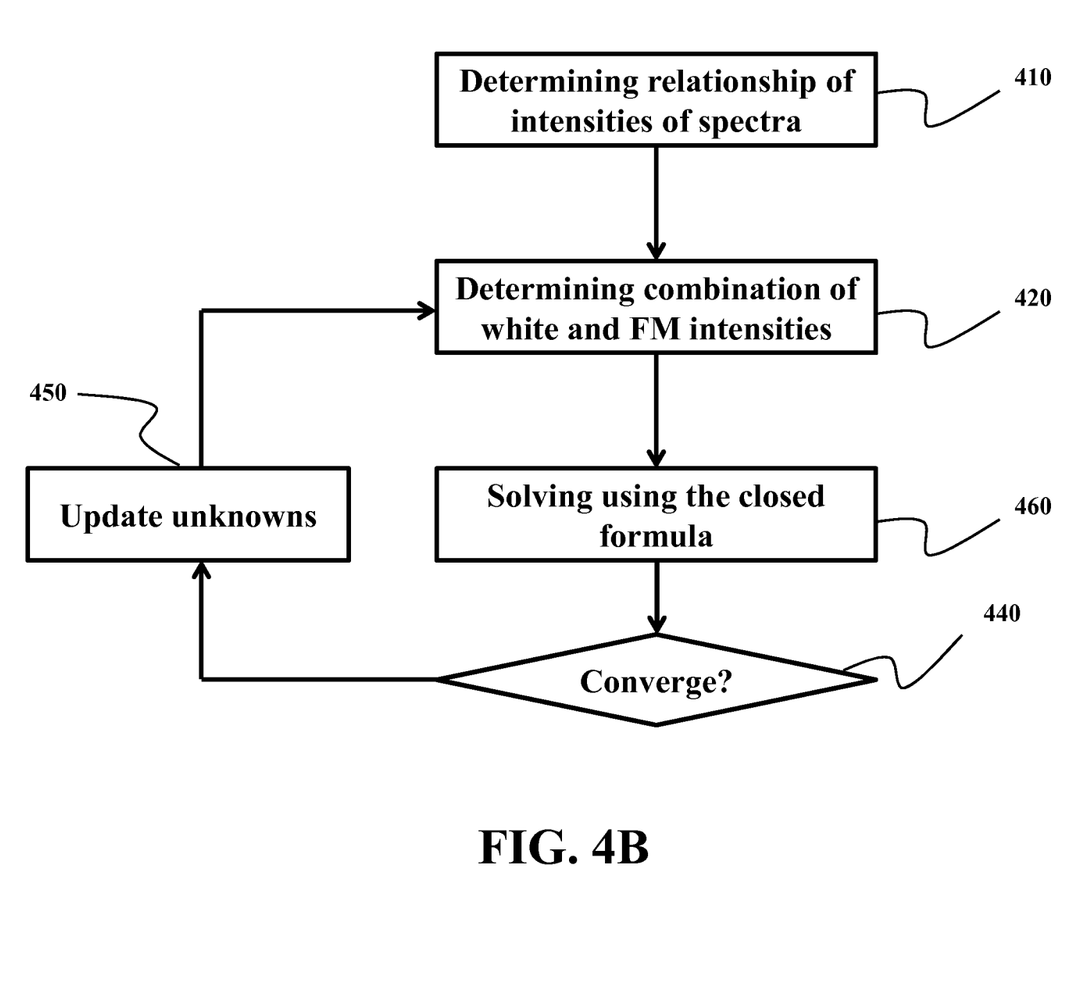

Such a solution can be time consuming, and in some implementations a precision of the solution is lessened in order to increase the speed. Some embodiments increase the speed of computation of the relationships of the spectra using a closed formula 460. In order to eliminate the integration, some embodiments accelerate the computation using the following formula $$\int_0^\infty \frac{\sin^2 \pi f't}{f'^2}(1-\cos 2\pi f'\tau_d)df' = \frac{1}{4}\pi^2(2|t| - |\tau - \tau_d| + 2|\tau_d| - |\tau + \tau_d|), \quad (6)$$

$$\int_0^\infty \frac{1}{f'}\frac{\sin^2 \pi f't}{f'^2}(1-\cos 2\pi f'\tau_d)df' = $$

$$\begin{cases} \frac{1}{2}\pi^2(4\tau\tau_d\,a\tanh(\tau_d/\tau) + & (\tau_d^2 < \tau^2), \\ \tau_d^2\ln\left(-1+\frac{\tau^2}{\tau_d^2}\right) + \tau^2\ln\left(1-\frac{\tau_d^2}{\tau^2}\right)\right), \\ 2\pi^2\tau_d^2\ln(2), & (\tau_d^2 = \tau^2\,\&\,\tau_d > 0), \\ \frac{1}{2}\pi^2(4\tau\tau_d\,a\tanh(\tau/\tau_d) + & (\tau_d^2 > \tau^2) \\ \tau_d^2\ln\left(1-\frac{\tau^2}{\tau_d^2}\right) + \tau^2\ln\left(-1+\frac{\tau_d^2}{\tau^2}\right)\right), \end{cases}$$

Precomputed Combinations of Noise Components

The computation of the equation of for the measurement of the linewidth (4) is complicated. Using the closed formulae (6) and (7) can accelerate the computational time, but still, the computational time is not negligible. Therefore, some embodiments of the invention precompute the measurements of the linewidth for different combinations of the values of the white and LF FM components of the noises and use the precomputed combinations of noise components to select the actual combination.

Figure 5:
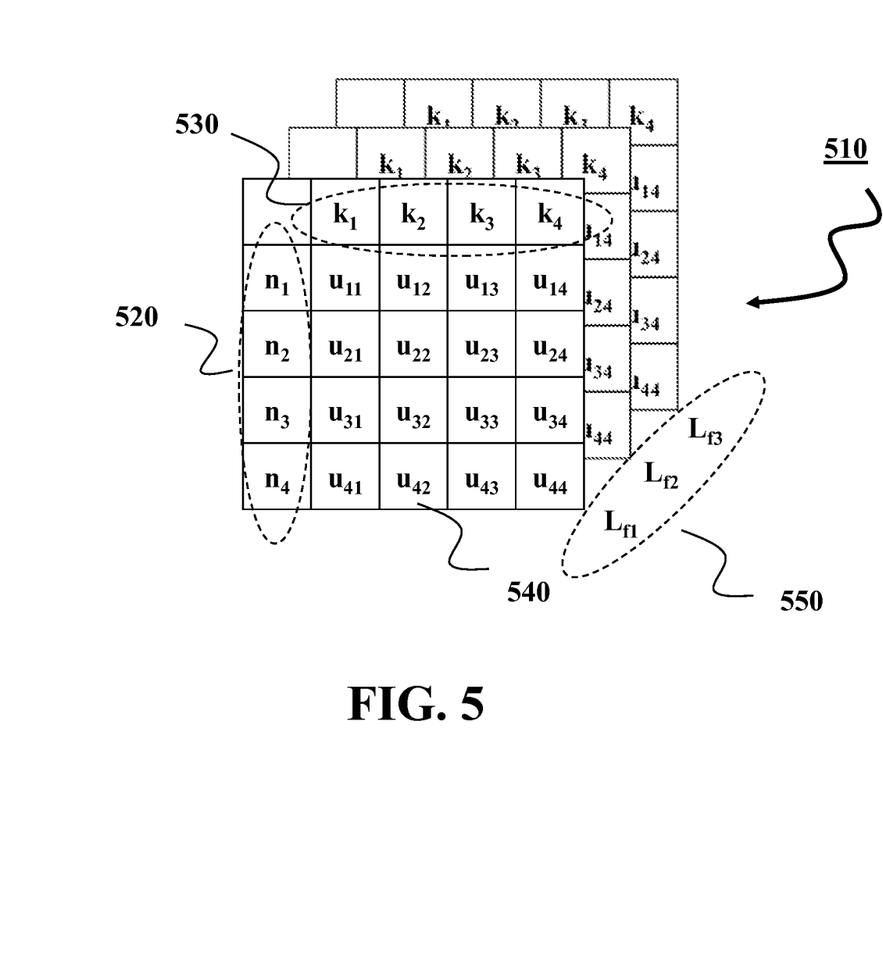
FIG. 5 is a lookup table storing a set of precomputed values of the of the optical signal transmitted over a set of predetermined distances and corresponding combination of the values of the white and LF FM noises used to determine the linewidth according to some embodiments of the invention.

FIG. 5 shows a group of lookup tables 510 storing a set of precomputed values of the linewidth $u_i$ 540 of the optical signal transmitted over a set of white FM noise values $n_i$ 520 and the LF FM noise values $k_i$ 530 used to determine the linewidth of the optical signal. The lookup tables are created for each optical fiber length $L_{f_i}$ 550 from the set of predetermined distances. In the example of FIG. 5, four values of the linewidth 520 and four values of LF FM noise 530 are used for each lookup table, and three values of the optical fiber length 550, but other number of values is possible. For example, in one embodiment, the three measurements 135 of the linewidth are compared with the precomputed values 540 for each corresponding fiber length 550, and average of the square of errors are calculated for all the combinations of 520 and 530, and the lowest combination is selected as the actual combination.

Figure 6:
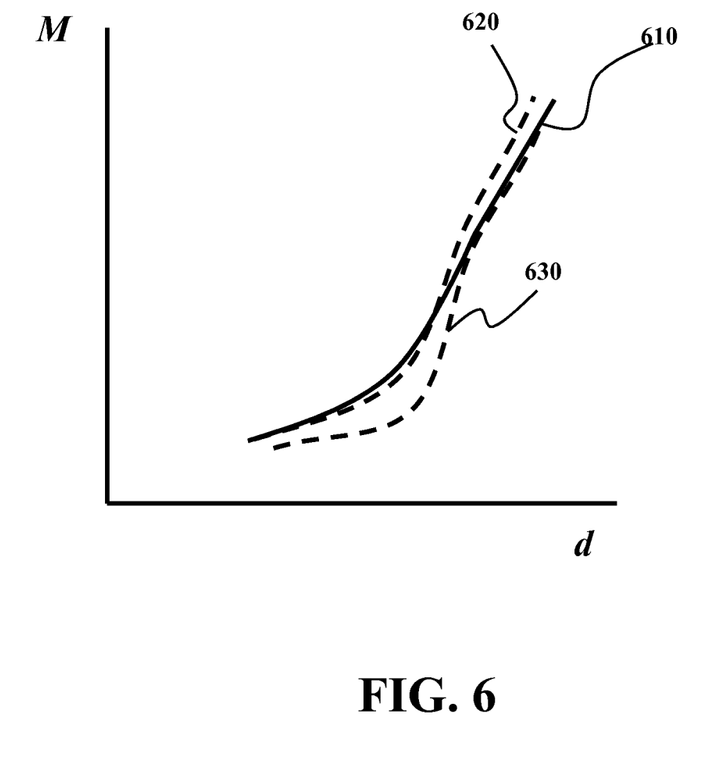
FIG. 6 is a graph for selecting the closest values to the measurements according to one embodiment.

FIG. 6 shows a graph for selecting the closest values 540 according to one embodiment. This embodiment fits curves, e.g., the curves 620 and 630, formed by an interpolation of values of the linewidth of the optical signal calculated for the set of predetermined distances with different combination of values of the white FM noise and the LF FM noise into a curve 610 formed by the measurements, and selects the values the white FM noise and the LF FM noise corresponding to the closest fit. For example, if the curve 620 formed by a combination of values v1 for white FM noise and v2 for LF FM noise is closer to the curve 610 than the curve 630 formed by a combination of values v3 for white FM noise and v4 for LF FM noise, the combination of values v1 and v2 is selected as the actual values of the components of the noise.

Figure 7A:
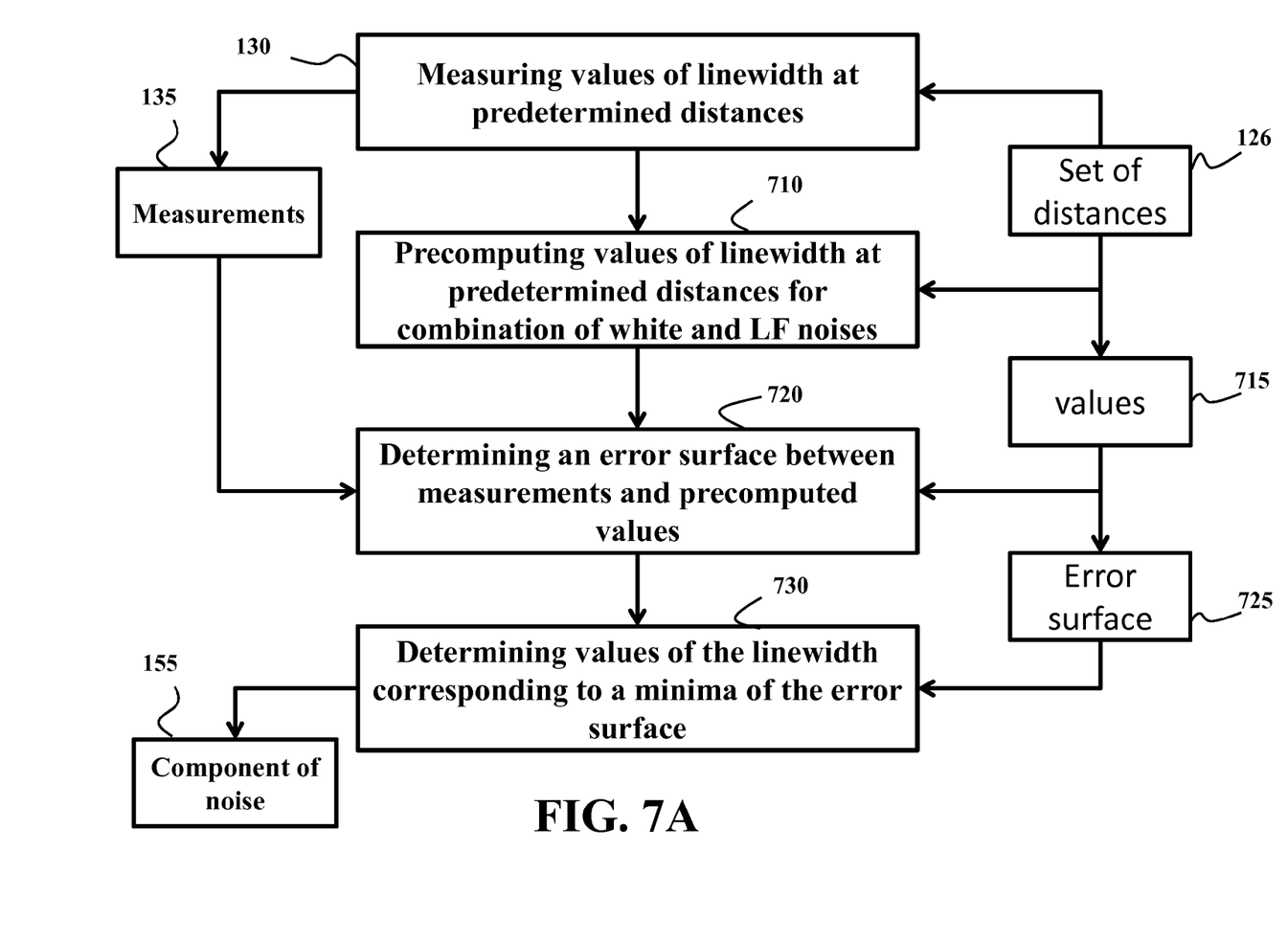
FIGS. 7A and 7B respectively are a block diagram and a schematic of another embodiment for determining the combination of values of the white and LF noises according to some embodiments of the invention.
Figure 7B:
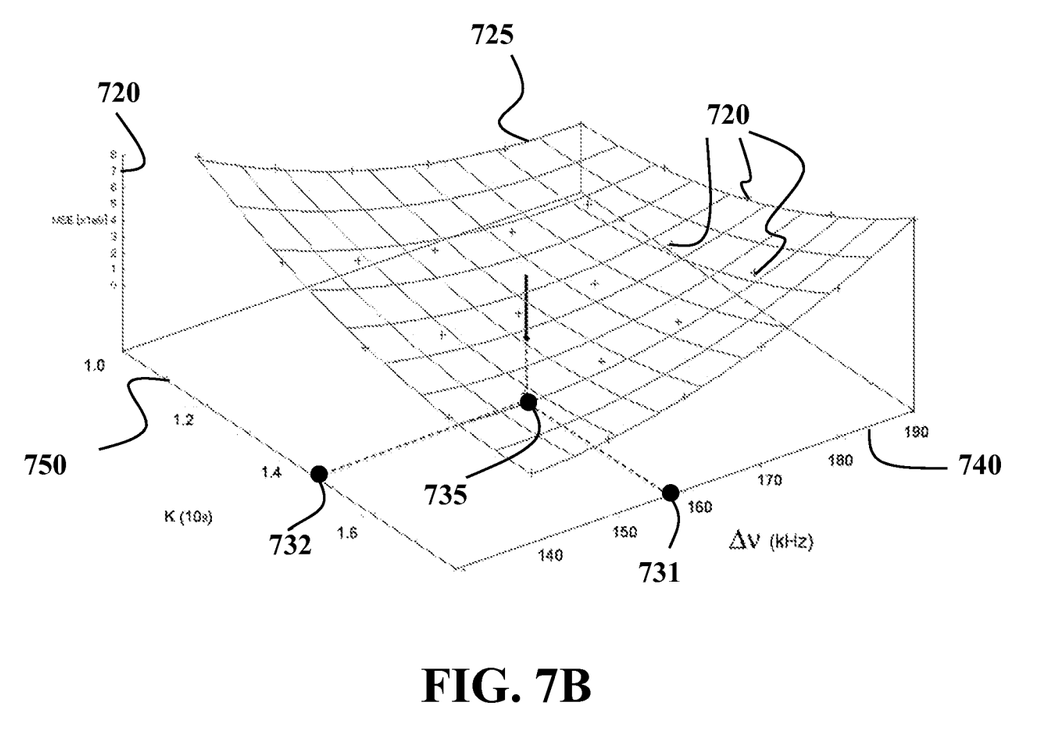

FIGS. 7A and 7B show a block diagram and an illustration of another embodiment for determining the combination of values of the white and LF noises that minimizes the error between measured linewidth and the values of the linewidth determined with the combination of values of the white and LF noises. This embodiment allows determining the combination of values of the white and LF noises even if the values for this specific combination of values of the white and LF noises are not predetermined.

The embodiment precomputes 710 values of linewidth of the optical signal for predetermined distances 126 for different combination of values of the white and LF noises. For example, the combination of values of the white and LF noises are sampled on a grid of values of the white FM noise 740 and the LF FM noise 750.

After the values 135 of the linewidth of the optical signal propagated over the predetermined distances 126 are measured 130, the embodiment determines errors 720 between the measurements 135 and the precomputed values 715 and determines 720 an error surface 725 formed by the errors between the measurements and precomputed values. Next, the embodiments determines the components of noise 155 by determining 730 values 731 and 732 of the combination of the components of the noise corresponding to a minima 135 of the error surface 725. One implementation of the embodiment selects only the value 731 of the white FM noise.

For example, the error between the measurements 135 and the precomputed values 715 can be determined as a sum of square errors between corresponding measurement and precomputed values for each propagated distance. The error surface 725 can be a curve surface $$ax^2+bxy+cy^2+dx+ey+f, \quad (8)$$

fitted using a least square method, wherein x and y are unknowns (a white FM noise and LF FM noise values for example) and a-f are parameters to be fitted to best describe the error surface. However, the determination of the error and the error surface can vary for different embodiments. One the parameters a-f are determined, the local minima can be determined simply from equation (8).

Some embodiments of the invention can determine the square errors in a normalized way, i.e., divided by the calculated linewidth for example. Because the error is expected to be larger when the calculated linewidth is larger, the normalization ensures that each square error is treated equally.

Some embodiments of the invention can use an elliptic fitting curve described as $$\frac{(\cos(\alpha)(x-x_0)+\sin(\alpha)(y-y_0))^2}{a^2} + \frac{(\sin(\alpha)(x-x_0)+\cos(\alpha)(y-y_0))^2}{b^2} + c, \quad (9)$$

where $\alpha$, $x_0$, $y_0$, a, b, and c are fitting parameters, wherein a is the angle of the axis of the ellipsoid, $x_0$ and $y_0$ are the location of the local minimum, a and b are the lengths of semi-principal axes.

Measuring Linewidth of Optical Signal

Figure 8:
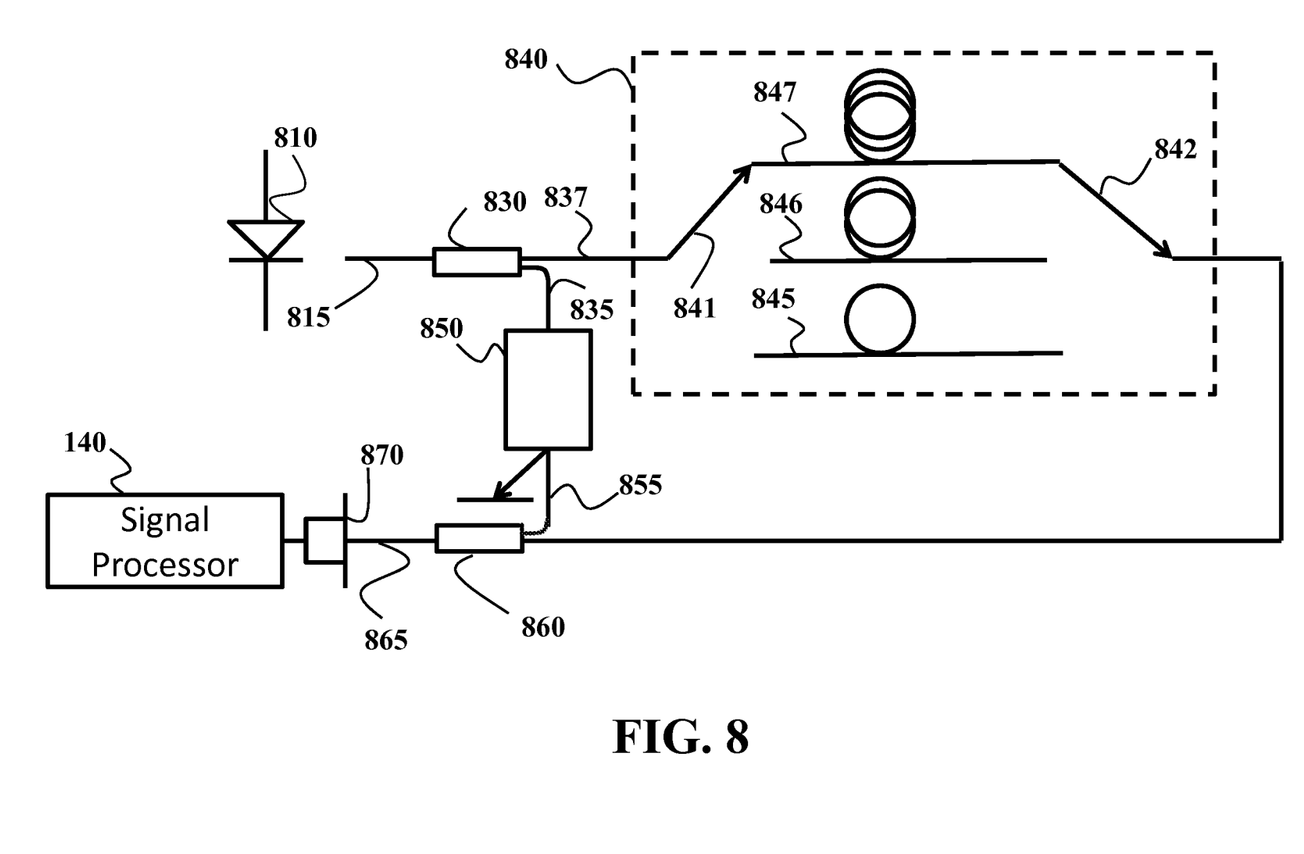
FIG. 8 is a block diagram of a system for determining a linewidth of an optical signal according to one embodiment of the invention.

FIG. 8 is a block diagram of a system 800 for determining a linewidth of an optical signal according to one embodiment of the invention. The system includes a laser source 810, e.g., a laser diode, for generating an optical signal 815 to be tested by measuring its linewidth. In some embodiments, the system 800 is designed to test different laser sources, such that the laser sources 810 can be exchanged to be tested and are not part of the system 800.

The optical signal 815 is split by a beam splitter 830 into a first signal 835 and a second signal 837. The first signal 835 is directed to a frequency shifting module 850, e.g., an acousto-optic modulator. The frequency shifting module 850 changes a frequency of the signal 835 to produce a signal 855. Usually, the frequency difference between the signals 835 and 855 is predetermined, e.g., 100 MHz. Such a frequency difference can be accurately measured by a sensor 870, e.g., a photodiode.

The second signal 837 is directed to a waveguide 840 for propagating the signal over different distances. The waveguide 840 can include optical switches 841-842 for sequentially direction the signal 837 into fibers 845, 846,847 of different length. In alternative embodiments, the waveguide 840 includes optical splitter for directing concurrently the signal 837 into the fibers of different length. In such embodiments, the signals 837 delayed over the fibers are processed concurrently by the processor 140.

The signal propagated over the waveguide 840 is beamed with frequency shifter signal 855 in a combiner 860. The beating of the signal generates a signal 865 having a frequency of the frequency difference between the signals 835 and 855. The intensity of the signal 865 is captured by the sensor 870 to measure the spectrum I(f) and process the signal 140.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for measuring a linewidth of an optical signal, comprising:
    an optical sensor determining a set of measurements of the linewidth of the optical signal propagated over different distances, such that each measurement corresponds to a different distance and includes a white frequency modulation (FM) noise and a low frequency FM noise; and
    a processor for determining values of the white FM noise and the LF FM noise reducing a difference between the measurements and values of the linewidth of the optical signal calculated for the different distances with the values of the white FM noise and the LF FM noise.

2. The system of claim 1, further comprising:
    a memory for storing precomputed combinations of different values of the white FM noise and the LF FM noise, wherein the processor selects a combination of the values the white FM noise and the LF FM noise from the combinations.

3. The system of claim 2, wherein the processor fits curves formed by an interpolation of values of the linewidth of the optical signal calculated for the different distances with different pairs of values of the white FM noise and the LF FM noise into a curve formed by the measurements, and selects the values the white FM noise and the LF FM noise corresponding to the closest fit.

4. The system of claim 1, wherein the processor determines an error surface formed by errors between a curve formed by interpolation of the measurements and curves formed by interpolations of values of the linewidth of the optical signal calculated for the different distances with different pairs of values of the white FM noise and the LF FM noise, and wherein the processor determines at least the value of the white FM noise corresponding to a local minima of the error surface.

5. The system of claim 4, wherein the different pairs of values of the white FM noise and the LF FM noise are determined on a regular grid.

6. The system of claim 4, wherein each error includes a least square distance between the curve formed by interpolation of the measurements and a corresponding curve formed by the interpolation of the values of the linewidth of the optical signal.

7. The system of claim 1, wherein the optical sensor determines the set of measurements use a delayed self-heterodyne.

8. The system of claim 7, wherein the optical sensor comprises:
an optical splitter for splitting the optical signal into a first signal and a second signal;
a delay module for delaying the first signal over the different distances to produce a set of delayed signals, wherein the different distances are selected from a set of predetermined distances, such that each delayed signal is delayed over a corresponding predetermined distance selected from the set of predetermined distances;
an optical combiner for combining separately the second signal with each delayed signal to produce a set of beat signals having heterodyne frequencies; and
a sensor for measuring a linewidth of each beat signal to produce the set of measurements.

9. The system of claim 8, wherein the optical sensor further comprises:
a set of optical fibers, wherein each fiber has a length corresponding to the predetermined distance from the set of predetermined distances; and
an optical switch directing the first signal sequentially or concurrently into each optical fiber.

10. The system of claim 8, wherein the optical sensor further comprises:
an optical fiber loop, which has a length corresponding to the minimal predetermined distance from the set of predetermined distances;
an optical frequency shifter within the optical fiber loop; and
an optical fiber coupler, with which small portion of the optical signal is removed from the loop and fed into the combiner for the heterodyne detection.

11. The system of claim 1, wherein each predetermined distance is greater than 1 km.

12. The system of claim 1, further comprising:
a laser source for generating the optical signal; and
a waveguide for propagating the optical signal over the different distances.

13. A method for determining a linewidth of an optical signal, comprising:
propagating the optical signal over different distances selected from a set of predetermined distances;
measuring the linewidth of the optical signal propagated over the different distances to produce a set of measurements, each measurement corresponds to a predetermined distance from the set of predetermined distances and includes a white frequency modulation (FM) noise and a low frequency FM noise; and
determining values of the white FM noise and the LF FM noise reducing a difference between the measurements and values of the linewidth of the optical signal calculated for the set of predetermined distances with the values of the white FM noise and the LF FM noise.

14. The method of claim 13, wherein the measuring uses a delayed self-heterodyne method.

15. The method of claim 13, further comprising:
determining an error surface formed by errors between a curve formed by interpolation of the measurements and curves formed by interpolations of values of the linewidth of the optical signal calculated for the different distances with different pairs of values of the white FM noise and the LF FM noise; and
determining at least the value of the white FM noise corresponding to a local minima of the error surface.

16. The method of claim 15, wherein the different pairs of values of the white FM noise and the LF FM noise are determined on a regular grid.

17. The method of claim 15, wherein each error includes a least square distance between the curve formed by interpolation of the measurements and a corresponding curve formed by the interpolation of the values of the linewidth of the optical signal.

18. A system for measuring a linewidth of an optical signal, comprising:
a waveguide for propagating the optical signal over different distances selected from a set of predetermined distances;
an optical sensor determining a set of measurements of the linewidth of the optical signal propagated over the different distances, such that each measurement corresponds to a different distance and includes a white frequency modulation (FM) noise and a low frequency FM noise; and
a processor for determining a combination of values of the white FM noise and the LF FM noise forming to values of the linewidth of the optical signal over the different distances according to the set of measurements.

19. The system of the claim 18, wherein the processor determines the combination of the values of the white FM noise and the LF FM noise reducing a difference between the measurements and the values of the linewidth of the optical signal calculated for the different distances with the values of the white FM noise and the LF FM noise.

20. The system of claim 19, wherein the processor determines an error surface formed by errors between a curve formed by interpolation of the measurements and curves formed by interpolations of the values of the linewidth of the optical signal calculated for the different distances with different pairs of values of the white FM noise and the LF FM noise, and wherein the processor determines at least the value of the white FM noise corresponding to a local minima of the error surface.

* * * * *